(12) United States Patent
Thompson et al.

(10) Patent No.: US 6,636,662 B1
(45) Date of Patent: Oct. 21, 2003

(54) PLANAR WAVEGUIDE DISPERSION COMPENSATOR

(75) Inventors: George H Thompson, Herts (GB); James E Whiteaway, Herts (GB); Terry Bricheno, Great Sampford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/739,528

(22) Filed: Dec. 15, 2000

(51) Int. Cl.[7] .................................................. G02B 6/34
(52) U.S. Cl. ............................ 385/27; 385/37; 385/132
(58) Field of Search .............................. 385/24, 27, 28, 385/37, 11, 119, 129, 132, 43

(56) References Cited

U.S. PATENT DOCUMENTS

| 4,028,643 | A | * | 6/1977 | Itoh | ............................... | 333/6 |
| 5,414,548 | A | * | 5/1995 | Tachikawa et al. | ......... | 359/130 |
| 5,570,439 | A | * | 10/1996 | Ido et al. | ....................... | 385/37 |
| 6,108,463 | A | * | 8/2000 | Herron et al. | ................ | 385/12 |

FOREIGN PATENT DOCUMENTS

EP 0901024 A2 8/1998

OTHER PUBLICATIONS

Article—'Smart Dynamic Wavelength Equalizer Based on an Integrated Planar Optical circuit for Use in the 1550–nm Region' (dated Sep. 9, 1999).
Article—'Dynamic Wavelength Equalizer in Silica Using the Single–Filtered–Arm Interferometer' (dated May 5, 1999).
Article—'Integrated WDM Dynamic Power Equalizer with Potentially Low Insertion Loss' (dated Oct. 10, 1998).
Article—'Automatic Wavelength Channel–by–Channel Equalizer'.

* cited by examiner

*Primary Examiner*—Robert H. Kim
*Assistant Examiner*—Therese Barber
(74) *Attorney, Agent, or Firm*—Barnes & Thornburg

(57) ABSTRACT

A planar dispersion compensator for an optical signal is provided. The compensator decomposes an inputted optical signal into N component signals separated by a fractional wavelength $\delta\lambda$. Each component signal has its path-length adjusted to induce a sufficient phase shift between input and output to change the group delay of the optical signal when recombined from each of the component signals. In this manner, pulse broadening can be compensated by selectively varying the induced phase shifts to produce the desired level of opposite group delay.

5 Claims, 8 Drawing Sheets

PLANAR WAVEGUIDE DISPERSION COMPENSATOR

FIELD OF THE INVENTION

The present invention relates to a planar waveguide dispersion compensator for an optical signal, and a method for compensating for dispersion in an optical signal.

BACKGROUND TO THE INVENTION

Glass fiber pulse code modulation (PCM) transmission systems are known to suffer from chromatic (wavelength dependent) dispersion. Such dispersion leads to optical signals propagating along a fiber being subject to delays in their propagation time along the fiber which depend on their wavelength. This variable delay generates several problems in optical communications networks. As transmission rates increase in digital optical communications networks cheap, reliable and efficient means to implement dispersion compensation and to control the pulse profile of an optical signal during transmission through optical media are becoming highly desirable.

The theoretical approach to preventing spread in a digital signal during transmission involves compensating for the variations in phase that arise from a frequency dependent group velocity in the transmission system.

Two ways a system may compensate for dispersion are adding a length of line, for example an additional length of optical waveguide, of opposite dispersion characteristics to the previous portion of the line or applying a suitable phase-versus-frequency characteristic to the signal. Consider the case where a spectral component of a signal propagating along line 1 of length $z_1$ has angular frequency $\omega$. The spectral component has a propagation constant $\beta_1$ along line 1. Along an additional length of line, line 2 of length $z_2$, the spectral component has a propagation constant $\beta_2$. Either propagation constant $\beta_1, \beta_2$ may be frequency dependent. If the initial, arbitrary, phase is $\Phi_0$, then the phase at output is $\Phi_1 = \omega t + \emptyset_0 - \beta_1 z_1 - \beta_2 z_2$.

The change of phase at a given frequency deviation $\delta\omega$ from the center frequency is given by $\{t - (d\beta_1/d\omega)z_1 - (d\beta_2/d\omega)z_2 - \beta_2(dz_2/d\omega)\}\delta\omega$. To prevent distortion of the signal, the phase variation should remain zero over the whole range of frequencies contained within it. As the $d\beta/d\omega$ and $dz/d\omega$ terms can vary over the frequency range, it is necessary that the second derivative with respect to frequency is also zero giving:

$$\underset{(1)}{(d^2\beta_1/d\omega^2)z_1} + \underset{(2)}{(d^2\beta_2/d\omega^2)z_2} +$$

$$\underset{(3)}{2(d\beta_2/d\omega)(dz_2/d\omega)} + \underset{(4)}{\beta_2(d^2z_2/d\omega^2)} = 0$$

The above equation shows three ways that are available for compensating group delay distortion in a fixed length $z_1$ of line 1 represented by term (1). Firstly, term (2), can provide compensation by adding line 2 of length $z_2$ of opposite group velocity dispersion. Secondly, term (3) can provide compensation when the length $z_2$ of line 2 is linearly dependent on the frequency. Thirdly, term (4) can provide compensation when the length $z_2$ of line 2 is a strongly quadratic function of frequency and dominates term (3). Inducing a sufficiently negative dispersion of group velocity to enable an optical pulse to remain unchanged as it propagates requires consideration of a number of factors, particularly in a planar waveguide environment. Although polymer materials can provide a negative dispersion of group velocity, such materials are generally considered unsuitable for pulse reforming due to size constraints in a planar waveguide device. An optical pulse needs to have a relatively long propagation path within the polymer material to ensure a sufficiently negative group delay dispersion is induced.

Another way to induce a negative group velocity dispersion for a signal is to linearly change the path-length of each component signal of a pulse to induce a sufficient relative change in phase with respect to the relative wavelength difference between the component signals. This is described by term (3) in the equation and can be achieved in non planar optical environments for example, by using an adjustable chirped grating.

Conventional dispersion compensators using techniques such as stretchable chirped fibre gratings to alter the refractive index of the fibres implementing the grating are complex, expensive, and are subject to fatigue.

SUMMARY OF THE INVENTION

One object of the present invention seeks to obviate or mitigate the above problems by providing a dispersion compensator for an optical signal. Another object of the present invention seeks to provide a method of compensating for dispersion in an optical signal. Another object of the invention seeks to provide an optical component including a dispersion compensator. Another object of the invention seeks to provide a node for an optical network including a dispersion compensator. Another object of the invention seeks to provide an optical transmission system including a dispersion compensator. Yet another object of the invention seeks to provide a planer waveguide strip lens for use in a dispersion compensator. Yet another object of the invention seeks to provide a composite strip lens for use in a dispersion compensator.

One aspect of the invention provides a dispersion compensator for an optical signal comprising:

an arrayed waveguide grating having a number M of waveguides, the arrayed waveguide grating decomposing the optical signal into N component signals each having a separation wavelength $\delta\lambda$ from an adjacent component signal;

at least one path-length adjuster varying the path-length of at least one of the N component signals to induce a phase shift $\Delta\phi$ between the initial phase of each component signal in the AWG waveguides and the final phase of each component signal output by the AWG waveguides; and a recombiner to re-combine the phase-shifted component signals into a re-combined signal, wherein the phase shift $\Delta\phi$ of each component signal is selected to adjust at least one characteristic of the optical signal in the re-combined signal.

The dispersion compensator may further include an M:N coupler, wherein the arrayed waveguide grating is connected to the M:N coupler such each of the N component signals is carried along one of N waveguides.

The component signal separation wavelength $\delta\lambda$ multiplied by the number of waveguides N preferably equals the bandwidth $\Delta\lambda$ of the optical signal.

At least one path-adjuster may comprise at least one lens having a refractive index which is capable of differing from the refractive index of a waveguide along which a component signal is propagating.

At least one path-adjuster preferably comprises at least one strip lens having a refractive index which is capable of differing from the refractive index of a waveguide along which a component signal is propagating, and wherein at least one strip lens is thicker at either end than in a middle portion.

Preferably, at least one characteristic is a group delay of the optical signal.

Preferably, the phase shift $\Delta\phi$ of each component signal is a quadratic function of the wavelength of each component signal.

At least one characteristic of the optical signal adjusted is preferably a width of a pulse profile of the optical signal.

The phase shift $\Delta\phi$ of each component signal is preferably determined to induce an appropriate dispersion compensating group delay for the re-combined signal.

Preferably, the recombiner comprises: a reflector capable of reflecting the phase shifted component signals; the reflector being provided so that the phase shifted component signals return along their incident paths.

For example, the reflector may be a mirror or mirror or a partially silvered mirror(s).

The recombiner may include a N:M coupler; an arrayed waveguide having a number M of waveguides, and M:1 coupler provided to combine the phase shifted component signals into a single signal.

The path length adjuster may have at least one thermal characteristic affecting the path-length of at least one component signal, and the dispersion compensator may further include thermal control means controlling the path adjustment means.

The dispersion compensator may further include a polarisation adjuster to adjust the polarisation of the component signals.

The dispersion compensator thus advantageously enables an optical signal which has undergone dispersion to be narrowed within an optical medium. By providing such a dispersion compensator as a planar waveguide device, the dispersion compensator is compact and easily integrated into optical components.

A second aspect of the invention seeks to provide a method of compensating for dispersion in an optical signal comprising the steps of:

decomposing the optical signal into component signals which differ from each other by a fractional wavelength $\delta\lambda$;

adjusting the phase of each component signal by an induced phase shift $\Delta\phi$; and re-combining each component signals into a re-combined signal, wherein the phase shift $\Delta\phi$ is selected to adjust at least one characteristic of the optical signal in the re-combined signal.

The method may further comprise the step of selecting the induced phase shift $\Delta\phi$ to determine a group delay dispersion of the re-combined signal.

Preferably, the method further includes the step of selecting the phase shift $\Delta\phi$ to provide a different group delay dispersion for the re-combined signal to the initial group delay dispersion of the optical signal.

Preferably, the method further includes the step of selecting the phase shift $\Delta\phi$ of each component signal to induce zero group delay dispersion in the re-combined signal.

The method may further include the step of selecting the phase shift $\Delta\phi$ of each component signal to be a function of the wavelength of each component signal.

The method may further include the step of selecting the phase shift for each component signal to be a quadratic function of the wavelength of each component signal.

The method may further include the step of selecting the phase shift of each component signal to adjust the width of a pulse profile of the optical signal.

The method may further include the step of adjusting the phase of each component signal using thermally dependent path-length adjusting means to adjust the relative path-length of the component signals.

The method may further include the step of adjusting the polarisation of each component signal.

A third aspect of the invention seeks to provide an optical component including a dispersion compensator according to a first aspect of the invention.

A fourth aspect of the invention seeks to provide a node for an optical network including a dispersion compensator according to a first aspect of the invention.

A fifth aspect of the invention seeks to provide an optical transmission system including a dispersion compensator according to a first aspect of the invention.

A sixth aspect of the invention seeks to provide a planar waveguide dispersion compensator for an optical signal which applies a phase shift $\Delta\phi$ to the optical signal, where the phase shift $\Delta\phi$ is a function of the wavelength of the optical signal, and wherein the phase shift $\Delta\phi$ is selected to adjust at least one characteristic of the optical signal in the re-combined signal.

A seventh aspect of the invention seeks to provide a planar waveguide strip lens, the strip lens comprising: a middle portion of substantially uniform thickness; and at least one end portion substantially thicker than said middle portion. Preferably, at least one end portion is stepped.

An eighth aspect of the invention seeks to provide a planar waveguide composite lens comprising a plurality of strip lens, at least one strip lens comprising: a middle portion of substantially uniform thickness; and at least one end portion substantially thicker than said middle portion. Preferably, at least one end portion is stepped. Preferably, the composite lens has a substantially parabolic profile.

Any features of the above features may be suitably incorporated in any of the above aspects as would be apparent to a person skilled in the art. Moreover, terms such as adjuster are to be construed to include appropriate equivalents capable of acting as an adjuster as would be obvious to those skilled in the art. Similarly, terms such as re-combiner are to be construed to include appropriate equivalents capable of acting as a signal recombiner.

The invention thus provides a planar dispersion compensator for an optical signal. The compensator decomposes an inputted optical signal into N component signals separated by a fractional wavelength $\delta\lambda$. Each component signal has its path-length adjusted to induce a sufficient phase shift between input and output to change the group delay dispersion of the optical signal when recombined from each of the component signals. This behaviour is described by term (4) in the equation presented herein above. In this manner, pulse broadening can be compensated by selectively varying the induced phase shifts to produce the desired level of opposite group delay dispersion.

Advantageously, the dispersion compensation mechanism provides a means of inducing a group delay dispersion opposite to that of an optical signal in a relatively compact area. This is particularly advantageous in optical networks which carry traffic at high transmission rates. In any high-bit rate environment it is highly advantageous to be able to compensate signal dispersion in a reliable and compact manner.

By compensating for dispersion in the optical layer, both passive or active dispersion compensation can be implemented i.e. the amount of compensation may be predetermined (passive) or actively adjusted. Another advantage of the invention is that the invention can be implemented in a planar optical device.

The invention enables digital optical signal processing which comprises one or more instances of apparatus embodying the present invention, together with other additional apparatus.

By using the differential thermal response of different materials in a planar AWG, the mechanical strain/stress mechanisms such as stretchable chirped fibre gratings employ can be avoided.

BRIEF DESCRIPTION OF THE DRAWINGS

In order to show how the invention may be carried into effect, embodiments of the invention will now be described by way of example only and with reference to the accompanying figures in which.

DETAILED DESCRIPTION OF INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
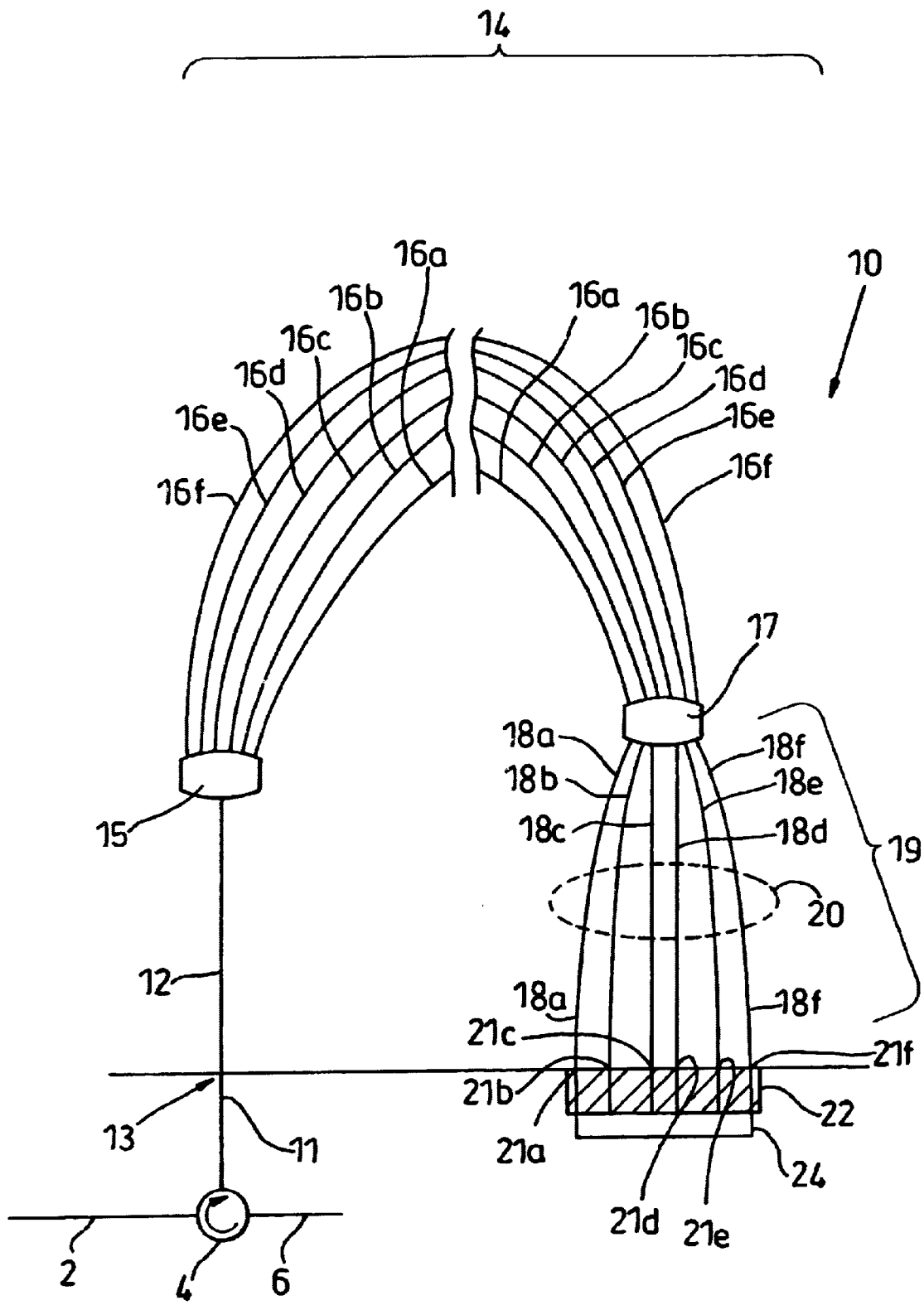
FIG. 1 shows a sketch of a dispersion compensator according to the invention.

Referring now to the drawings, FIG. 1 is a sketch of a dispersion compensator 10 according to a first embodiment of the invention. In FIG. 1, the dispersion compensator 10 is implemented as a planar device.

In FIG. 1, an optical signal travelling along channel 2 passes through circulator 4 to channel 11. An optical signal returning along channel 11 is directed along channel 6. The optical signal is received by the planar waveguide dispersion compensator 10 from channel 11 via optical port 13 and continues along waveguide 12. Waveguide 12 is connected to an arrayed waveguide grating (AWG) 14 by a 1:M coupler 15. The optical signal is typically pulsed, and may be a high-speed digital optical signal, for example, with a transmission rate exceeding 10 Gbits/s Here M indicates the number of grating arms, or waveguides $16a, \ldots, f$ in the array. In FIG. 1, M=6 for clarity. In a physical device M is large, and the path length difference between the waveguides is adjusted to provide a free spectral range $\Im$. Effectively, $\Im$ is the small range of wavelengths which any given waveguide selects as input from the incident spectrum to ensure that at the ouput of the AWG any given wavelength emerges predominantly from only one waveguide (and only weakly from its neighbours).

The free spectral range $\Im$ is determined to be appropriately greater than the operational signal bandwidth. The relationship between $\Im$ and the operational signal bandwidth will be affected by where the device is positioned, see for example, FIGS. 2A and 2B.

Figure 2A:
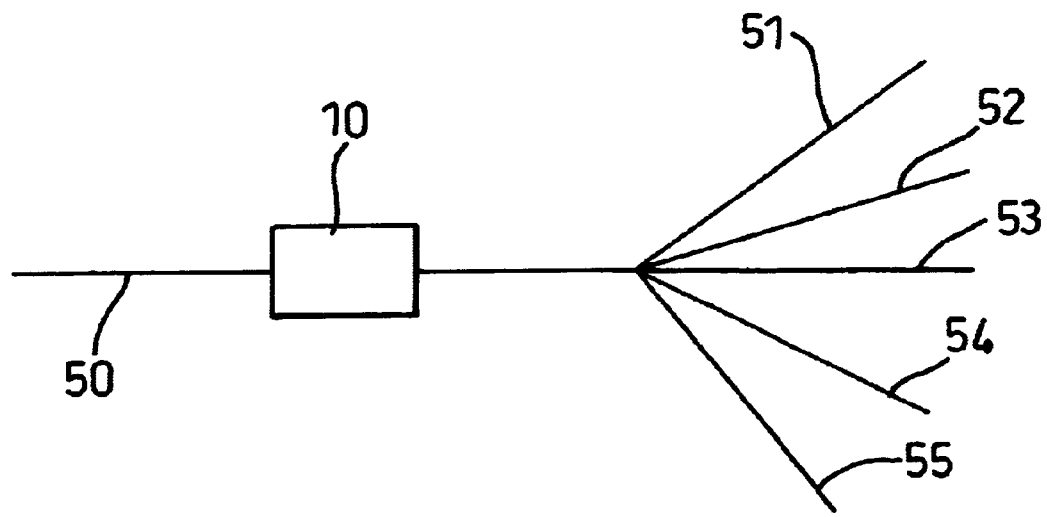
FIGS. 2A and 2B show alternative optical environments implementing the invention.
Figure 2B:
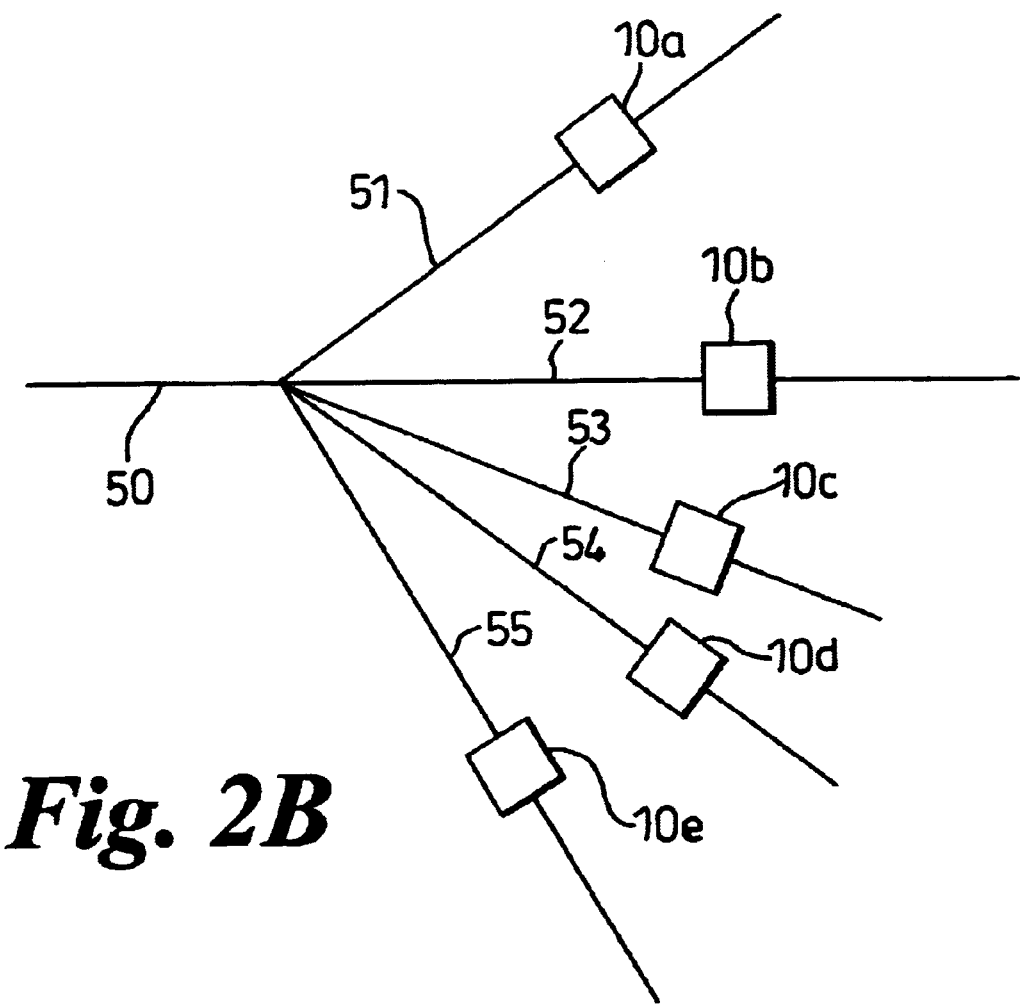

If each channel is equally separated from its neighbours in optical frequency then a single dispersion compensator 10 which has a free spectral range equal to the channel separation can be implemented as FIG. 2A sketches. In FIG. 2A, the dispersion compensator 10 is implemented on a single channel 50 capable of carrying a multiplexed signal prior to the signals being demultiplexed into a number of channels 51, 52, 53, 54, 55. This embodiment is suitable if the dispersion of each signal on the multiplexed signal, and/or the distortion in each channel 51, 52, 53, 54, 55 is the same. Otherwise, a separate dispersion compensator $10a, \ldots, 10e$ needs to be implemented for the optical signal demultiplexed into each channel 51, 52, 53, 54, 55 as FIG. 2B sketches, to compensate for the individual dispersive properties of each channel. If the free spectral range of the dispersion compensation is equal to the channel spacing, identical components can be used in each channel.

A large M enables a signal to be decomposed into a large number N of component signals over a given bandwidth. If the bandwidth occupies a fraction f of the free spectral range $\Im$ the maximum acceptable number of component signals will be N=fxM. The larger N is in any physical implementation, the better the physical dispersion compensation. It is envisaged the N must lie in the range 25 to 100 for effective dispersion control over a typical bandwidth although N is not limited to this range. f and M must be chosen to suit.

The AWG 14 thus separates the input optical signal into a series of N component signals, each component signal differing from its neighbours central bandwidth by a predetermined amount dependent on the wavelength sensitivity of the AWG and the number of waveguides of the AWG.

Returning now to FIG. 1, component signals carried along the wave-guides $16a, \ldots, f$ are fed into a dispersive region 19 via M:N coupler 17. Coupler 17 connects M wave-guides $16a, \ldots, f$ respectively to wave-guides N $18a, \ldots, f$. A path length adjuster 20 is designed to introduce relative phase changes $\delta\phi$ between pairs of adjacent wavelengths $\lambda_\alpha$, and $\lambda_\beta$ in adjacent guides. This produces in each pair of adjacent wavelengths a group delay at the average of the two adjacent wavelengths that is equal to the difference in phase $\delta\phi$ divided by the difference in optical angular frequency $\delta\omega$, i.e.

$$\tau\left(\frac{\lambda_\alpha + \lambda_\beta}{2}\right) = \delta\phi/\delta\omega.$$

There is a limit to the maximum phase change, say $\delta\phi_{max}$ that can be introduced between adjacent guides $18a, \ldots f$, which is set by the increase in transmission loss that results. This affects wavelengths that divide between two adjacent guides as the portion of their fields no longer in phase at the output is lost.

For a given maximum relative group delay $\tau$, the maximum allowable wavelength interval $\delta\lambda$, between guides $18a, \ldots, f$ according to the above criterion is inversely proportional to τ. For a given group delay dispersion, the maximum value τ is proportional to the operational bandwidth Δλ. Hence δλ is proportional to 1/Δλ.

The number of waveguides $16a, \ldots f$ $N=\Delta\lambda/\delta\lambda+1$, and is therefore approximately proportional to $\Delta\lambda^2$. Typically values for Δλ are 0.5 nm, with δλ=17 pm. This gives a suitable value of N=31.

Referring again to FIG. 1, an index matched fluid 22 is provided to ensure that the component signals emerging from optical ports $21a, \ldots, f$ are reflected from by suitable reflector means, for example a suitable prism arrangement or a mirror. In the embodiment of FIG. 1, mirror 24 reflects the component signals back to their original waveguides, unaffected by roughness of the planar waveguide edge. Mirror 24 may be any suitable device, and may be partially or fully reflecting as appropriate for any particular implementation.

Figure 3A:
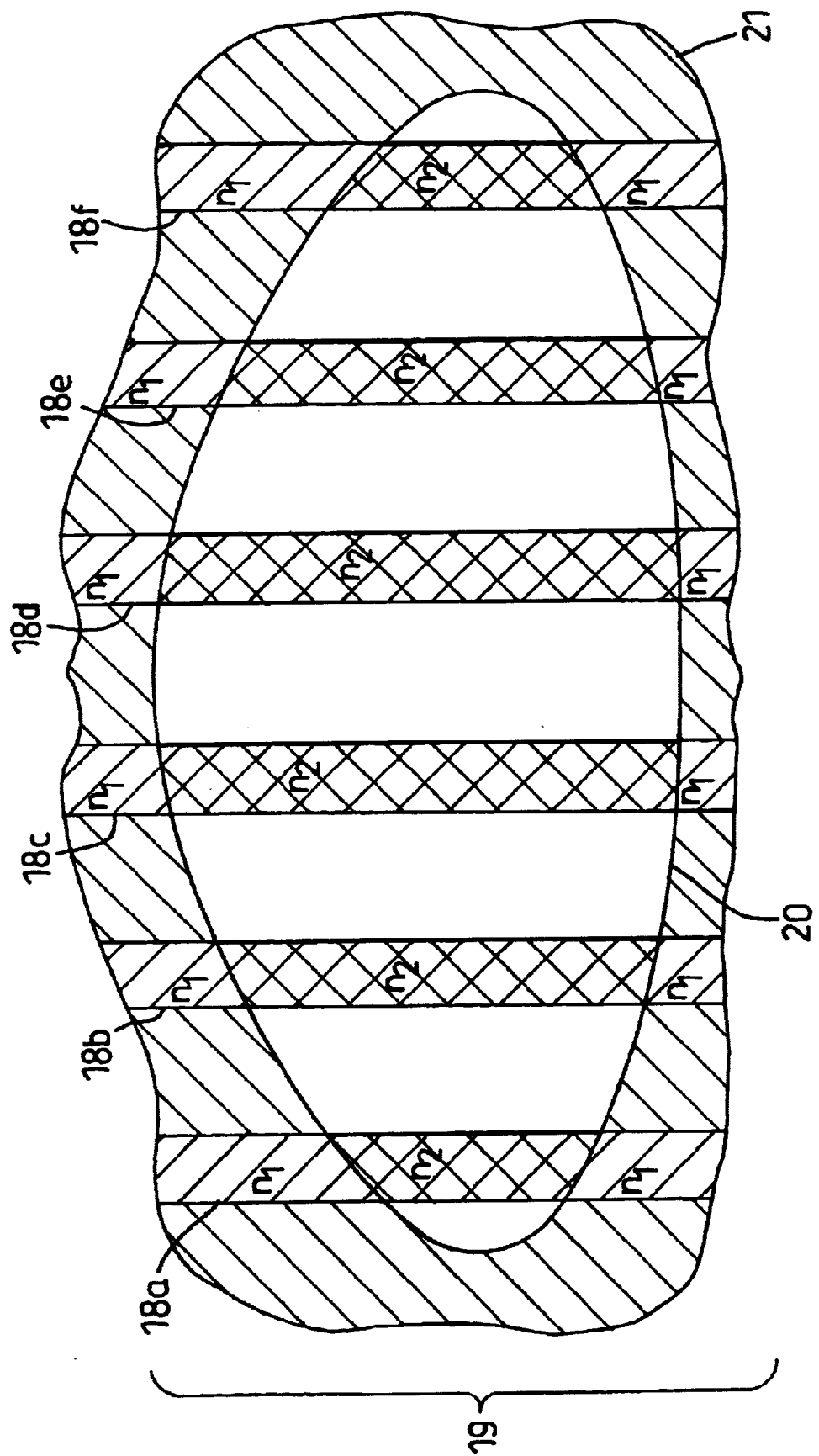
FIG. 3A shows a sketch of an enlarged section of FIG. 1.
Figure 3B:
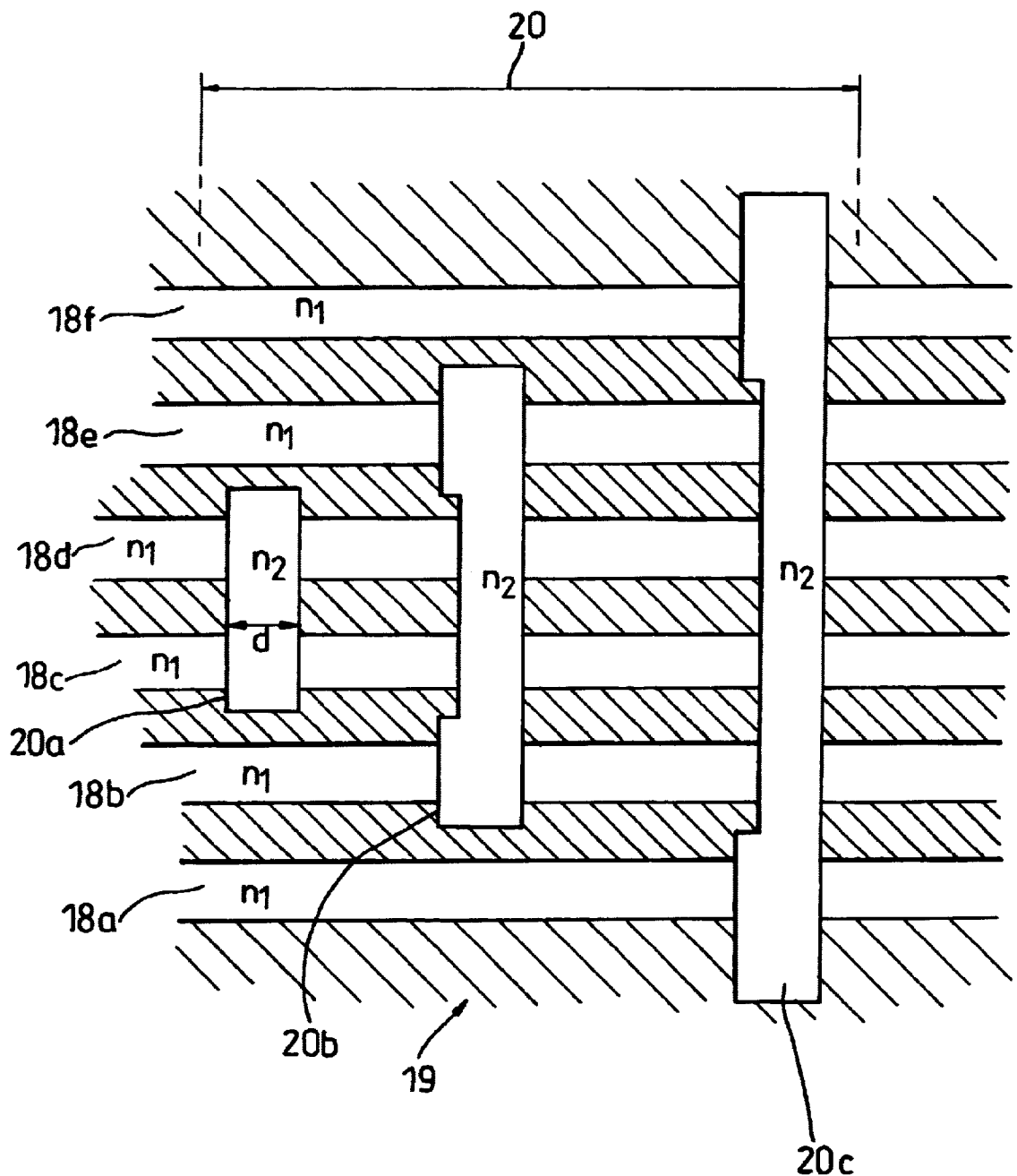
FIG. 3B shows sketch of an alternative embodiment to that shown in FIG. 3A.

FIGS. 3A and 3B illustrates the dispersive region 19 of FIG. 1 in more detail, where the dispersive region 19 includes path length adjuster 20. The path length adjuster 20 comprises a lens in FIG. 3A, and a lens equivalent in FIG. 3B. The path length adjuster 20 has an adjustable refractive index n2, which may be made to differ from the refractive index n1 of the waveguides $18a, \ldots, f$. In FIG. 3B the lens equivalent comprises a series of strips collectively having a lens type functionality. The strips may be laminar, however, in the best mode contemplated by the inventor, the ends of some strips are thicker than their middle portions so that the strips have a slightly parabolic shape, or U-shape, such as is illustrated in FIG. 3B.

Referring to FIG. 3B, the series of strips 20a, 20b, 20c, each have an adjustable index $n_2$ different from that of the waveguides, $18a, \ldots, f$ and each strip $20a, \ldots, c$ intersect one or more of the waveguides $18a, \ldots, f$. The strips are narrow enough such that the interruption of the waveguides causes very little radiation loss.

The path length adjuster(s) $20, 20a, \ldots, c$ may be individually or collectively heated to adjust their refractive index/indices for each waveguide in the case the refractive index/indices are thermally dependent. Alternatively, an electric field may be applied, or it is possible for some form of strain to be applied to the waveguides along a predetermined section so as to adjust the refractive index to the desired value. The magnitude of the adjustment to the refractive index is selected to provide the desired variation of group delay.

In FIG. 3B each strip 20a, 20b, 20c can be selected to have a desired characteristic, for example, refractive index, and/or shape and/or composition. These characteristics, in particular the overall configuration of the path-length adjusting means 20 formed by strips 20a, 20b, 20c and the refractive index of the strips, determine the relative phase-shift δφ induced between adjacent wave-guides in the array. Typically suitable materials for a strip lens will be polymer or polymer based material(s).

Figure 3C:
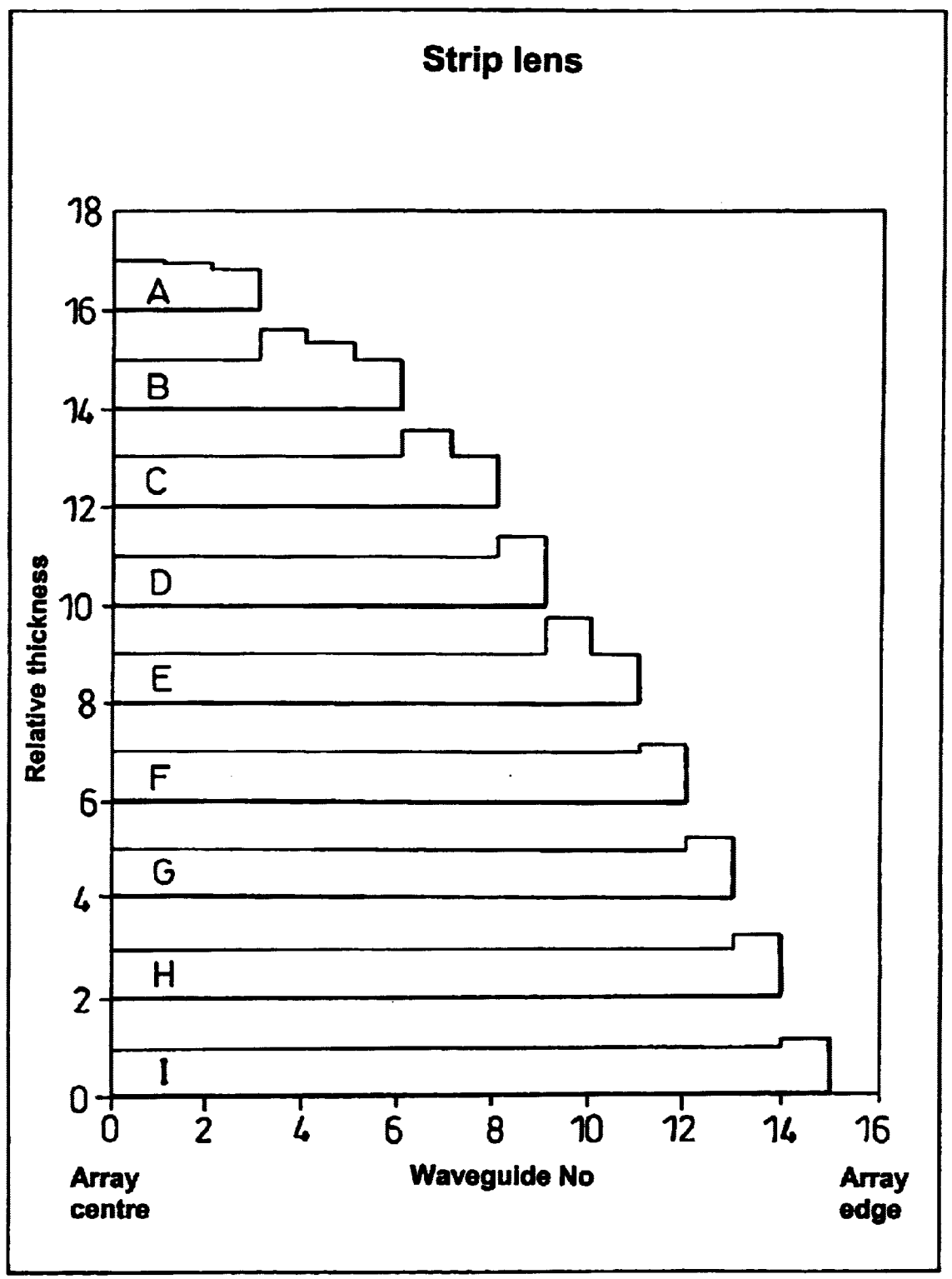
FIG. 3C sketches a range of strip lens configurations according to an embodiment of the invention.

FIG. 3C illustrates an alternative embodiment of the invention in which a symmetric configuration of strip lens are provided. FIG. 4C sketches one half of a composite lens equivalent comprising a number of strip lens, A to I.

In FIG. 3C, the top strip lens A has a convex profile, which is stepped in the illustrated example. The subsequent lower strip lens B to I all have parabolic or U-shape overall profiles. Certain strip lens, B,C,E have stepped outer edges so that the outer edge of the composite lens varies more smoothly as a function of waveguide number from the array centre out towards the array edge. In FIG. 3C, the total waveguide number N is 31.

The stepped edges enable the strips collectively to provide a better approximation to the required dispersion compensation function than uniform thickness strips could provide. Each strip may differ in thickness from adjacent strips if so desired. In a specific embodiment the refractive index n2 of the polymer forming the strips varies with respect to that of the silicon waveguide $18a \ldots f$ over a 40° C. temperature rise by approximately—0.017. The maximum combined thickness of all the strips at the centre of the lens is chosen to be about 100 μm. This provides in conjunction with the polymer index variation, a variation in group delay of approximately 500 ps/nm over an operational band width of 0.5 nm.

Other suitable lens equivalents include modifying a portion of the waveguides $18a, \ldots, f$ to have an adjustable refractive index n2 which is different from the refractive index n1 of the material forming the remaining portion of the waveguides $18a, \ldots, f$. The lens-type functionality can then be achieved by ensuring the length of each portion with the different refractive index differs for each waveguide $18a, \ldots, f$ according to a predetermined amount so as to induce an appropriate group delay for the component signals as a whole.

Figure 4:
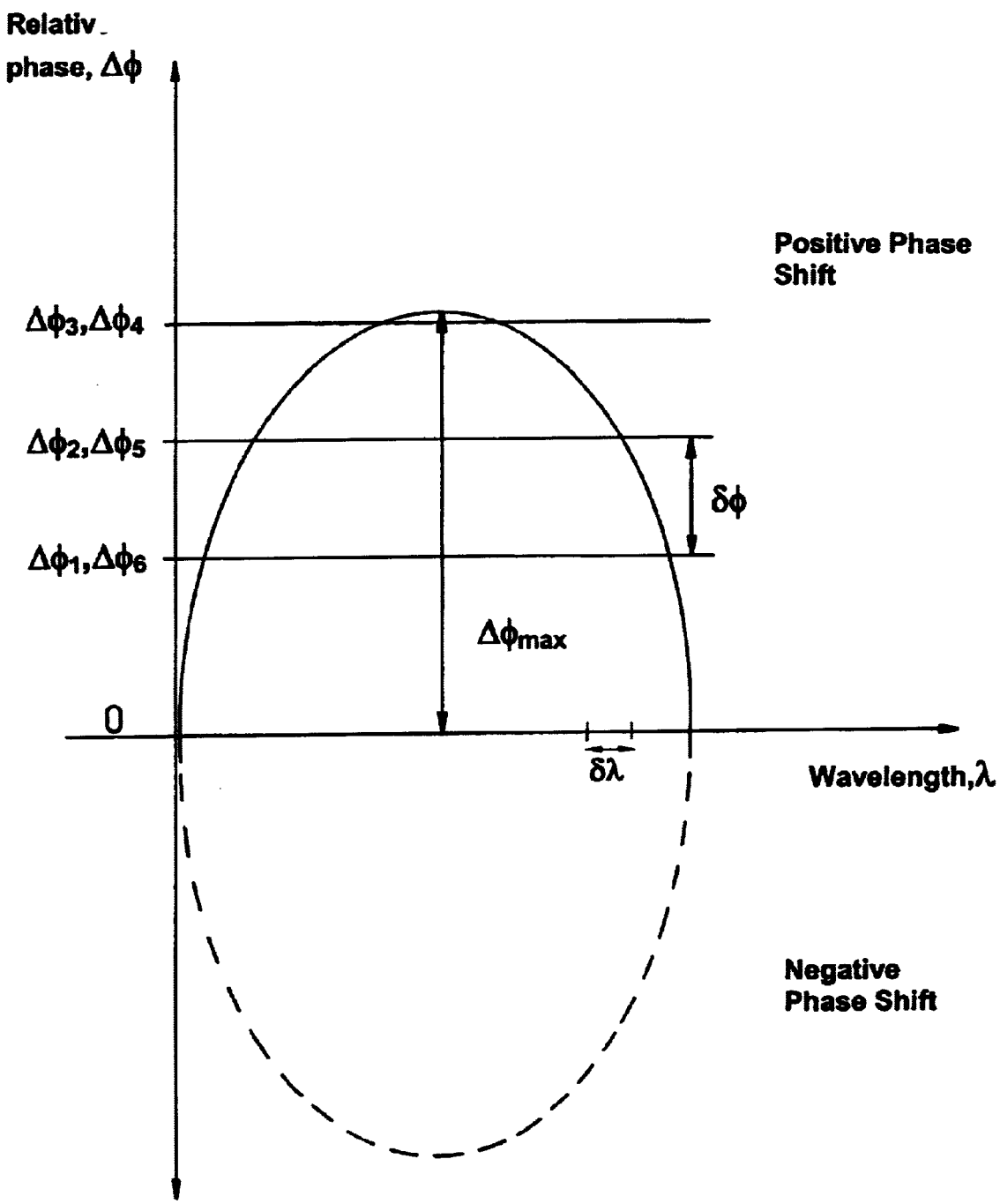
FIG. 4 shows a sketch illustrating the relationship between the component wavelengths and the induced phase $\Delta\phi$ shift according to the invention.

FIG. 4 illustrates the relationship between the relative phase shifts δφ between adjacent waveguides, the total induced phase shift Δφ, and the wavelength spacing between component signals δλ. δλ is constant, but may vary in alternative embodiments of the invention. FIG. 4 illustrates the two extremes of Δφ which can exist in a device equally capable of compensating positive and negative group delay dispersion. In FIG. 4 the upper curve provides positive Δφ compensation, the lower curve negative Δφ compensation.

In the best mode contemplated by the inventor, the path-length adjusting means 20 is symmetrical with respect to the centre of the array of waveguides $18a, \ldots, f$, the total induced phase-shifts Δφ are symmetrical about the centre of the array of waveguides $18a, \ldots, f$, and the total induced phase-shifts Δφ are a quadratic function of the waveguide $(18a, \ldots, b)$ position in the array, i.e. Δφ is a quadratic function of λ.

The invention thus provides a means of dynamically controlling the profile of an optical signal in the optical layer by providing a physical implementation of a dispersion compensating medium which has an appropriate functional relationship between the component signals wavelength λ and the relative phase shift Δφ.

Whilst the above embodiment is contemplated for the purposes of pulse narrowing, pulse reshaping generally may be provided, particularly in the case where the refractive index of the path-length adjusting means is individually controlled for each waveguide. Moreover if further feedback means are provided to dynamically control the phase shift of each $18a, \ldots, f$ waveguide in the region of dispersion 19, distortion in an optical pulse profile can be automatically corrected within the optical layer.

As δλ is fixed per device, a desired amount of adjustment to the group velocity, and the resulting dispersion control, is obtained by controlling the path-length adjusting means 20. For example, the phase-shifts induced could be adjusted by actively varying the refractive index of the polymer material, or otherwise controlling the phase-shifts induced by the path-length adjusting means. For example, for thermally responsive path-length adjusting means 20, thermal effects can be used. Thermal variation affects the signals in at least two ways.

Firstly, heat expands the physical dimensions of the wave-guides and affects the transverse and lateral components of the path-length of a component signal within a wave-guide. Secondly, the path-adjusting means may incorporate material having a thermally sensitive refractive index. This will similarly produce a change in path-length as the temperature changes. The temperature of the polymer lens can be adjusted using any suitable thermal control apparatus.

Alternatively, an electric control mechanism could be implemented to vary the refractive index of a suitably responsive material, or other suitable means may be used, for example, the Kerr effect in which the intensity of a signal affects the refractive characteristics of a medium through which the signal propagates.

For the purposes of ensuring dispersion compensation, it is likely that a quadratic variation of phase will be normally sufficient for inducing the desired variation of group delay with wavelength. This will ensure that by appropriate control of the quadratic phase shift, i.e., the amount of minimum dispersion, sufficient variation of group delay can be provided to induce the recombined signal to display a narrower profile than the input signal. However, other functional variations in phase may be adopted to compensate for group delay dispersion in alternative embodiments by suitably modifying the characteristics of the lens or lens equivalent.

The path length adjuster 20 can thus control the path adjustment for each waveguide 18a, . . . , f in a selective manner, or control the path length for all waveguides 18a, . . . , f collectively. Either way, the adjustment implemented is selected to induce a desired alternation of the group delay profile of the incident signal.

Returning to FIG. 1, the component signals propagate from the edge of planar AWG device through an index-matched medium 22 to mirror 24. At mirror 24, the component signals are reflected back towards the planar AWG component. Mirror 24 may be full or partially transmissive, and may be wavelength selective, as appropriate for any specific requirements.

In FIG. 1, the reflected component signals travel back through the path-length adjusting means 20 along wave-guides 18a, . . . , f and are combined by the coupler 15 into a re-combined optical signal. The optical signal travels back along channel 12 to the optical port 13 where it emerges from the planar dispersion compensator 10. An optical circulator is incorporated at the input so that the returning signal is directed away from the input path into a separate output 6.

Figure 5:
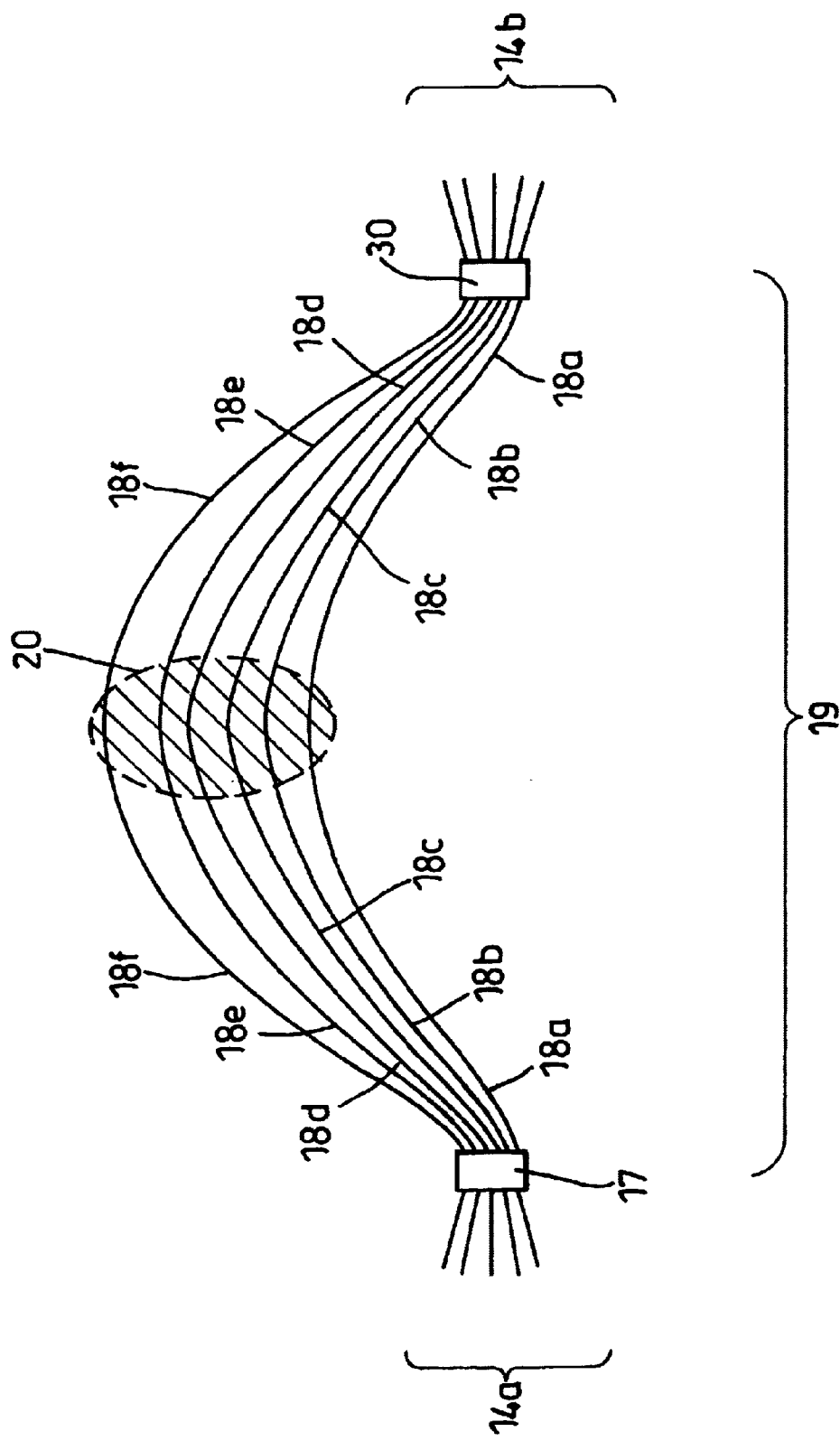
FIG. 5 shows a sketch of a dispersion compensator according to another embodiment of the invention.

An alternative embodiment is illustrated in FIG. 5, where like components to the components illustrated in FIG. 1 have retained their numbering scheme. In FIG. 4, a reflecting mirror 24 is not provided, and a N:M coupler 30 feeds the component signals emerging from the dispersive region 19 into a second AWG 14b which has matched characteristics to that of the first AWG 14a. The device illustrated in FIG. 4 can be considered to be mirrored along line XX', such that each half of the device is a mirror image of the other half.

The operation of a planar waveguide dispersion compensator according to the invention will now be described with reference to the accompanying drawings. Each waveguide 16a, . . . , f carries a component signal $\lambda 1, \ldots, \lambda 6$ such that $\lambda 2 = \lambda 1 + \delta \lambda$, where $\delta \lambda$ is the waveguide spacing. As a result of group delay distortion during transmission, each component signal is received by a waveguide at a fractionally different time from its neighbours, such that each component signal $\lambda 1, \ldots, \lambda 6$ has a fractionally different phase $\delta \phi$ that varies quadratically with wavelength.

As each signal passes through the path-length adjusting means 20, dispersion compensation is provided by adjusting the phase of each signal by an induced phase shift $\Delta \phi$ such that the total phase shift $\phi + \Delta \phi$ varies symmetrically outwards from the centre of the array.

As the number N of waveguides 16a, . . . , f increases, the wavelength between adjacent waveguides ($\delta \lambda$) can be selected to be sufficiently small for the group delay $\delta \phi / \delta \lambda$ to be substantial. For a quadratic variation in the induced $\Delta \phi$, such as FIG. 4 sketches, the relative small induced changes in phase shifts $\delta \phi$ can induce a substantial change in group delay, due to the relative small size of $\delta \lambda$.

By selecting a small enough $\delta \lambda$, i.e., by using a fine enough grating, an optical signal, such as a pulse or a digital signal, can be sufficiently decomposed to enable a path adjusting means provided integrally within a planar waveguide device to be used to compensate for dispersion. By selectively controlling the path-length means, for example, thermally, a range of dispersion in an optical signal can be compensated either actively in response to signal conditions, or by a pre-determined amount. In each case, the thermal adjustment may configure the path-length adjusting means to exhibit an appropriate refractive index along selected portions of an array of waveguides. The quadratic phase variation induces an opposite group delay variation to that originally present which results in the recombined signal having a narrower pulse profile than the incident signal.

The invention thus provides a means to compensate for dispersion which has not been feasible using earlier arrayed waveguide technology. Dispersion is compensated by splitting the signal into fractional differences in wavelength $\delta \lambda / \lambda$ which are small compared to the ratio of the wavelength to the maximum group delay length and applying a small fractional adjustment $\delta \phi / \Delta \phi$ to the relative phase of each component signal.

Planar waveguide gratings possessing the ability to split a broadband signal into a large number of waveguides with the required level of sensitivity are now available, e.g. $\delta \lambda = 80$ pm. Such planar waveguide devices are able to decompose signals into over 160 waveguides. The invention implements such technology to enable an optical signal to be decomposed into a high enough number of component signals whose bandwidths are sufficiently narrow.

Several other alternative embodiments of the invention will be apparent to those skilled in the art, and the scope of the invention is intended to be that covered by the claims.

Figure 6:
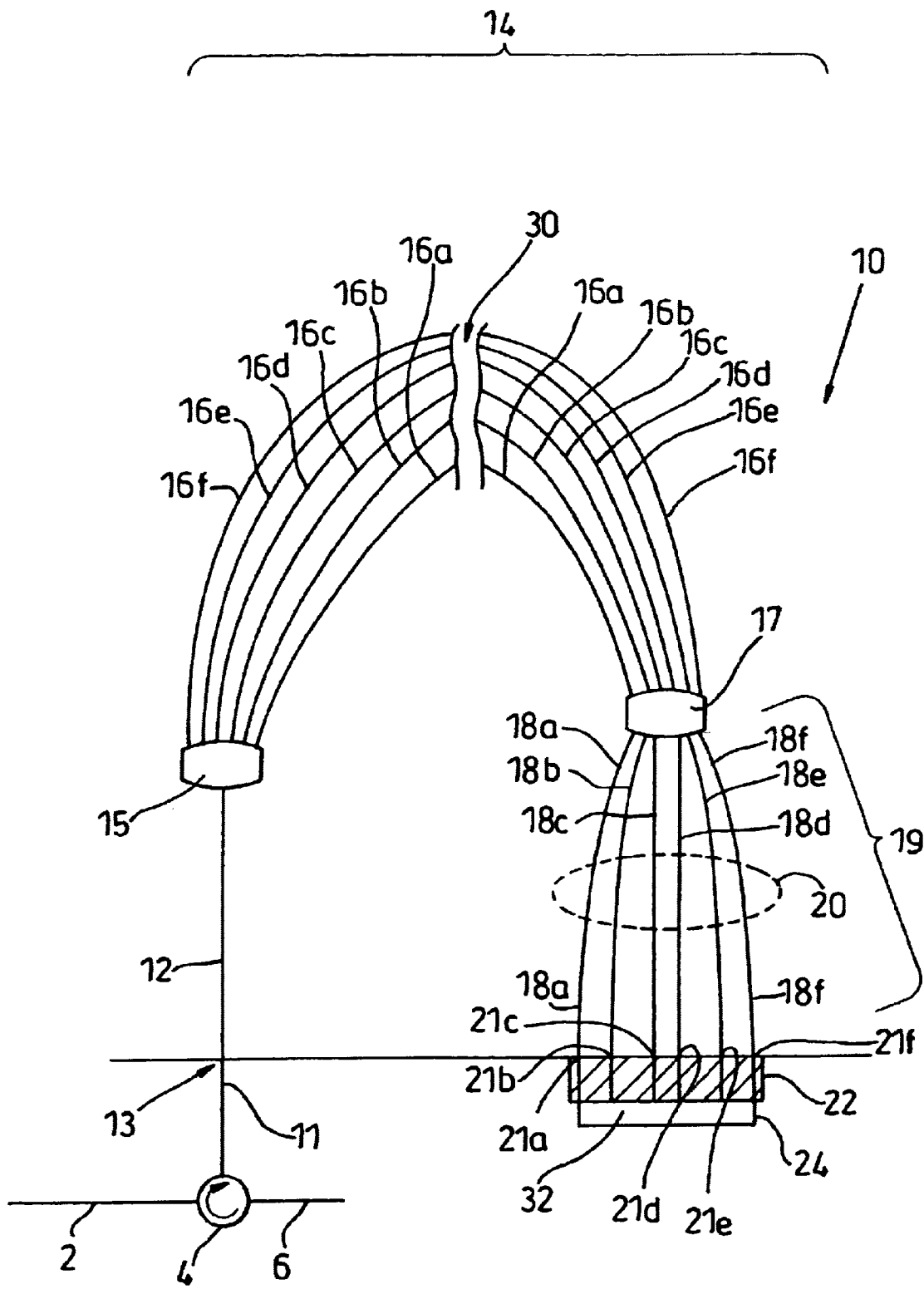
FIG. 6 sketches the dispersion compensation of FIG. 1 further including polarisation adjusting means.

For example in FIG. 6, additional polarisation correction means are included.

In FIG. 6, a half wavelength plate 30 is included to rotate through 90° the polarisation of signals propagating along waveguides 16a, . . . 16f, and other polarisation rotating means 32 are included adjacent to mirror 24. The other polarisation rotating means may, for example, comprise a quarter-wavelength plate set at 45° to the path of the optical signals.

Moreover it is obvious to a person skilled in the art, that in the embodiments incorporating reflector means, the component signals pass twice through the dispersion compensating region whereas in other embodiments (e.g. as illustrated in FIG. 5) the component signals pass only once through the dispersion compensating region, and the amounts of induced phase shifts must be determined accordingly.

Whilst the above embodiments have been described in the context of a planar device, functionally analogous components can be implemented in fibre and vice versa and the invention is intended to extend to either.

As is obvious to those skilled in the art, the dispersion compensator may be pre-adjusted to an initial or fixed level of compensation or dynamically adjusted in situ to a fixed level. Dynamic phase adjustment in situ in response to changing levels of signal dispersion may also be provided by the invention. Signals moreover may be circulated iteratively through the dispersion compensator to receive the desired level of dispersion compensation.

What is claimed is:

1. A planar waveguide dispersion compensator for an optical signal which applies a phase shift $\Delta\phi$ to the optical signal, where the phase shift $\Delta\phi$ is a function of the wavelength of the optical signal, and wherein the phase shift $\Delta\phi$ is selected to adjust at least one characteristic of the optical signal in the re-combined signal, said planar waveguide dispersion compensator comprising a planar waveguide strip lens, wherein said strip lens comprises a middle portion of substantially uniform thickness; and at least one end portion thicker than said middle portion.

2. A dispersion compensator as claimed in claim 1 further comprising:

an arrayed waveguide grating (AWG) having a number M of waveguides, the AWG decomposing the optical signal into N component signals each having a separation wavelength $\delta\lambda$ from an adjacent component signal, wherein said strip lens operates as a path-length adjuster varying the path-length of at least one of the N component signals, said at least one component signal travelling through said path-length adjuster, to induce a phase shift $\Delta\phi$ between the initial phase of each component signal in the AWG waveguides and the final-phase of each component signal output by the AWG waveguides, said path-length adjuster being capable of varying the optical path-length over a continuous range of optical path-lengths; and a recombiner to re-combine the phase-shifted component signals into a re-combined signal, wherein the phase shift $\Delta\phi$ of each component signal is selected to adjust at least one characteristic of the optical signal in the re-combined signal.

3. A planar waveguide composite lens comprising a plurality of strip lens, at least one strip lens comprising:

a middle portion of substantially uniform thickness; and at least one end portion thicker than said middle portion.

4. A planar waveguide composite lens as claimed in claim 3, wherein at least one end portion is stepped.

5. A planar waveguide composite lens as claimed in claim 3, wherein the composite lens has a substantially parabolic profile.

* * * * *